United States Patent
Antony et al.

(10) Patent No.: US 11,678,016 B1
(45) Date of Patent: Jun. 13, 2023

(54) REAL-TIME ENABLEMENT OF OTT APPLICATIONS

(71) Applicant: CSC Holdings, LLC, Bethpage, NY (US)

(72) Inventors: Jaison Antony, Dix Hills, NY (US); Heitor Almeida, Bethpage, NY (US); John Markowski, Bethpage, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 242 days.

(21) Appl. No.: 16/863,571

(22) Filed: Apr. 30, 2020

(51) Int. Cl.
*H04N 21/4627* (2011.01)
*H04N 21/6334* (2011.01)
*H04L 9/32* (2006.01)
*H04L 9/08* (2006.01)

(52) U.S. Cl.
CPC ......... *H04N 21/4627* (2013.01); *H04L 9/088* (2013.01); *H04L 9/3263* (2013.01); *H04N 21/63345* (2013.01)

(58) Field of Classification Search
None
See application file for complete search history.

(56) References Cited

U.S. PATENT DOCUMENTS

| | | | |
|---|---|---|---|
| 2014/0279597 A1* | 9/2014 | Kister | H04L 12/2809 705/317 |
| 2018/0376209 A1* | 12/2018 | Ramey | H04L 67/327 |
| 2020/0045519 A1* | 2/2020 | Raleigh | H04M 15/80 |

* cited by examiner

*Primary Examiner* — Omar S Parra
(74) *Attorney, Agent, or Firm* — Sterne, Kessler, Goldstein & Fox P.L.L.C.

(57) ABSTRACT

Disclosed herein are system, method, and computer program product embodiments for real-time enablement of over-the-top media service applications. An embodiment operates by receiving a device identifier from a customer device including a disabled third-party over-the-top (OTT) application, determining a verification status of the customer device based on the device identifier, determining a customer identifier associated with the customer device, and determining an entitlement status based on the customer identifier. The embodiment further operates by assigning a vendor-issued identifier to the customer identifier, generating a third-party token based on the verification status and the entitlement status, and sending the third-party token to the customer device and a third-party service associated with the disabled third-party OTT application. In some embodiments, the customer device and the third-party service may perform a handshake using the third-party token to enable the disabled OTT third-party application on the customer device.

20 Claims, 6 Drawing Sheets

REAL-TIME ENABLEMENT OF OTT APPLICATIONS

BACKGROUND

Typically, enabling an over-the-top (OTT) application on a set top box requires technical assistance for ease of use and security concerns. For example, enabling an OTT application on a set top box may require technical support provided by a service provider representative to protect secrets that could be used to provide unauthorized access to media content and media services offered by the service provider. With the proliferation of third-party OTT media applications, customers have begun to demand a simple and quick enablement experience that mirrors media application installation on other equipment platforms. However, existing technologies have been unable to provide a secure and automated experience, much less implement an automated enablement process that can meet varying security requirements across different third-party applications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a system for real-time enablement of over-the-top (OTT) media applications.

As mentioned above, existing technologies have been unable to provide a secure and dynamic experience for real-time enablement of OTT media applications. Embodiments herein address these challenges by generating secure tokens based on a security requirement of the OTT media application, and facilitating secure transfer of the secure tokens to customer devices and the third-party service that provides media content to the customer devices via the OTT media application.

Figure 1:
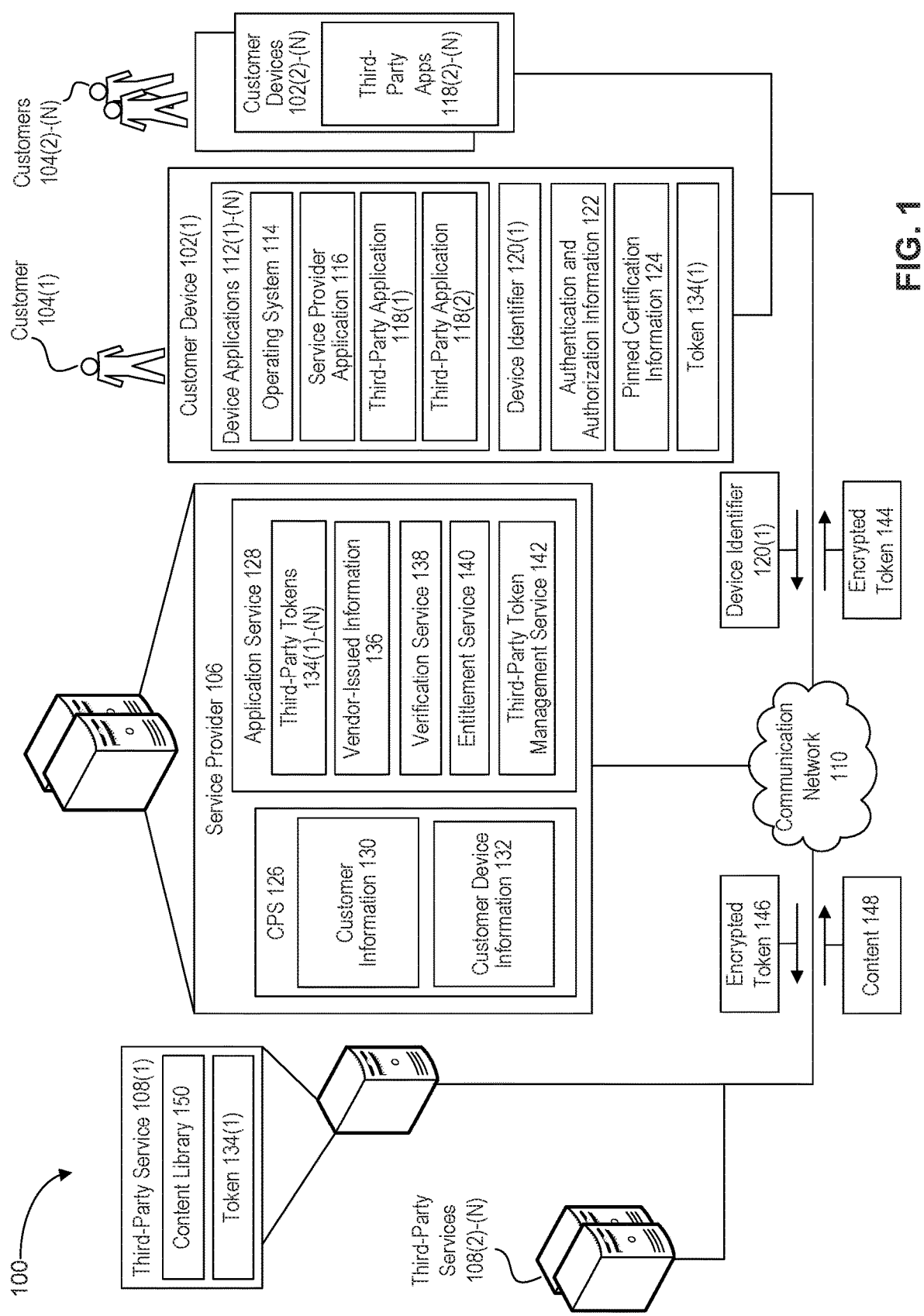
FIG. 1 is a block diagram of a system for real-time enablement of over-the-top media service applications, according to some embodiments.

FIG. 1 illustrates an example embodiment of a system 100 for real-time enablement of over-the-top media service applications in a customer premises equipment. As illustrated in FIG. 1, the system 100 includes a plurality of customer devices 102(1)-(N) associated with a plurality of customers 104(1)-(N), a service provider 106, and a plurality of third-party services 108(1)-(N). Further, the customer devices 102(1)-(N), the service provider 106, and the third-party services 108(1)-(N) may communicate via a communication network 110.

The communication network 110 may be implemented as a wireless communication network, a wired communication network, and/or any combination thereof as will be apparent to those skilled in the relevant art(s) without departing from the spirit and scope of the present disclosure. The communication network 110 may include any combination of a private network, personal area network (PAN), Local-Area Network (LAN), Wide-Area Network (WAN), or the Internet. Further, the communication network 110 may include one or more radio networks (e.g., terrestrial radio frequency network, satellite radio frequency network, etc.), one or more coaxial cable networks, one or more fiber optic cable networks, one or more hybrid fiber-coaxial networks, and/or any another suitable communication network.

In some embodiments, the communication network 110 may be configured to facilitate bi-directional communication of information, such as video, audio, and/or data, between the plurality of customer devices 102(1)-(N) and the service provider 106. For instance, the communication network 110 may include coaxial cable and fiber optic cable linked via one or more fiber nodes, and include frequency translation devices in support of a frequency stacking architecture, and may even include wireless links without departing from the spirit and scope of the present disclosure. Further, the service provider 106 may be implemented as a cable modem termination system (CMTS) of a cable communication system, as an optical line terminal (OLT) of a Passive Optical Network (PON), or as any other suitable centralized entity in a point-to-multipoint communication system that will be apparent to those skilled in the relevant art(s) without departing from the spirit and scope of the present disclosure.

Some examples of the customer devices 102(1)-(N) include set-top boxes (STBs), data terminal equipment; customer premises equipment; smart phones and mobile communication devices; tablet computing devices; video game consoles; portable media players; digital video recorders (DVR); wearable computing devices; desktops, laptops, netbooks and other portable computers; IoT (internet of things) devices; and/or any other device capable of receiving video, audio, and/or data from the service provider 106 or the third-party services 108(1)-(N). Each of the customer devices 102(1)-(N) may be associated with one of the customers 104(1)-(N). As an example, the customer 104(1) may subscribe to a service offered by the service provider 106 to receive media content (e.g., movies, television shows, news, and/or sports programming) via the customer device 102(1). Additionally, in some embodiments, the service provider 106 may rent out the customer devices 102(1)-(N) to the customers 104(1)-(N) for the duration of a subscription for cable television and/or Internet service.

As illustrated in FIG. 1, the customer devices 102(1)-(N) may include device applications 112(1)-(N). For instance, the customer device 102(1) may include an operating system 114, a service provider application 116, and a plurality of third-party applications 118(1)-(2). As used herein, and in some embodiments, a "device application" may refer to any computer program or software (e.g., client, agent, application, mobile application, web application, hybrid application, computer program, desktop application, or module) operable to run on the customer devices 102(1)-(N). In some embodiments, the third-party applications 118(1)-(N) may be OTT media applications. As used herein, an "OTT media application" may refer to a device application that provides streaming media directly to the customer devices via the Internet, and does not require a traditional broadcast or cable video infrastructure for content distribution.

The operating system 114 may be an application program configured to manage the basic functions of the customer device 102(1). The operating system 114 may be configured to schedule tasks, manage storage of data on the customer device 102(1), provide common services to the components and applications of the customer device 102(1), or communicate with peripheral devices associated with the customer device 102(1). Further, in some embodiments, the other device applications 112(1)-(N) may be configured to execute on the operating system 114.

Further, aspects of the device applications 112(1)-(N) may be provided based on services and/or data provided by the service provider 106 or the plurality of third-party services 108(1)-(N). For example, the service application 116 may permit the customer 104(1) to browse and playback media content offered by service provider 106(1). The service application 116 may include an electronic programming guide (EPG) that displays the programming and channels offered by the service provider 106. Further, the EPG may allow subscribers to initiate recordings, schedule recordings, playback previously created recordings, control playback in a variety of fashions, and perform other suitable video-on-demand functions.

As another example, the third-party application 118(1) may be a streaming content application that reproduces media content from the third-party service 108(1) via the Internet, and the third-party application 118(2) may be a streaming content application that reproduces media content from the third-party service 108(2) via the Internet. Further, the third-party applications 118(1)-(2) may be premium subscription services offered by service provider 106 via the third-party services 108(1)-(N). For example, the customer 104(1) may pay a monthly subscription to the service provider 106 to access the media content library of the third-party service 108(1) via enabled third-party application 108(1).

In addition, each customer device 102 may include a device identifier 120. For example, as illustrated in FIG. 1, the customer device 102(1) may include the device identifier 120(1). The device identifier 120(1) may identify the customer device 102(1) within the system 100. Some examples of a device identifier 120 include a serial number of the customer device 102(1), a chipset identifier of a chipset of the customer device 102(1), a subscriber identifier associated with the customer 104(1) in possession of the customer device 102(1), a media access control (MAC) address associated with the customer device 102(1), an internet protocol (IP) address associated with the customer device 102(1), a digital certificate or secret associated with the customer device 102(1), a subscriber identity module (SIM) card identifier, a digital fingerprint generated based on one or more attributes of the customer device 102(1), etc. In some embodiments, the device identifier 120 may be configured and/or set in the customer device 102 within a dark room. As used herein, in some embodiments, a "dark room" may be a high-security environment without Internet access.

The customer devices 102(1)-(N) may further include authentication and authorization information 122 issued to the customer devices 102(1)-(N) by the service provider 106. For example, the authentication and authorization information 122(1) may include authorization codes indicating the premium channels available to the customer device 102(1). As another example, the authentication and authorization information 122(1) may include a digital certificate or secret issued to the customer device 102(1). In yet still another example, the authentication and authorization information 122(1) may include a root digital certificate provided to the customer device 102(2) for performing authentication.

Further, the customer devices 102(1)-(N) may include pinned certificate information 124(1)-(N). For example, as illustrated in FIG. 1, the customer device 102(1) may include the pinned certificate information 124(1) associated with the service provider. In some embodiments, the pinned certificate information 124(1) may be a digital certificate issued to the service provider 106. Further, as described in detail herein, certain functions of the customer devices 102(1)-(N) may only be performed with remote devices (e.g., the service provider 106) that present a digital certificate matching the pinned certificate information 124. Further, in some embodiments, the customer devices 102(1)-(N) may perform mutual authentication with the service provider 106 using the authentication and authorization information 122(1)-(N) and the pinned certificate information 124(1)-(N). For instance, the customer device 102(1) may mutually authenticate with the service provider 106 by employing its own digital certificate within the authentication and authorization information 122(1) to authenticate to the service provider 106, and comparing the pinned certificate information 124(1) to digital certificate information received from the service provider 106 to authenticate the service provider 106.

The service provider 106 includes one or more centralized computing devices configured to provide a service, such bi-directional communication of information (e.g., video, audio, and/or data) to the customer devices 102(1)-(N). For example, the service provider 106 can provide media content, such as movies, television programs, and/or advertising, to the customer device 102(1). Further, as described herein, the service provider 106 may manage access by the customer devices 102(1)-(N) to media content within the system 100 based on subscription details. For example, the service provider 106 may provide a subscription service offering the customer devices 102(1)-(N) and media content accessible via the customer devices 102(1)-(N). As a part of the subscription offerings, customers 104(1)-(N) may add one or more of the third-party services 108(1)-(N) to their subscription package, and access the third-party services 108(1)-(N) via the third-party applications 118(1)-(N). As such, the system 100 must provide a secure and efficient means of provisioning and enabling the third-party applications 118(1)-(N) on customer devices 102(1)-(N) belonging to customers 104(1)-(N) that subscribe to the third-party services 108(1)-(N) via the service provider 106.

As illustrated in FIG. 1, the service provider may include a customer provisioning system (CPS) 126 and an application service 128. The CPS 126 may include the customer information 130(1)-(N) and the customer device information 132(1)-(N). The first customer information 130(1) may correspond to the first customer 104(1), the Nth customer information 130(N) may correspond to the Nth customer 104(N), and so forth. Further, the first customer device information 132(1) may correspond to the first customer device 102(1), the Nth customer device information 132(N) may correspond to the Nth customer device 102(N), and so forth.

Some examples of customer information 130(1)-(N) include customer identifier, subscription information, viewing history, usage history, associated customer devices, associated device identifiers, authentication information, authorization information, encryption information, user preferences, location information, biographical information, demographic information, special needs and disabilities, billing information, executed service agreements, contact information, etc. Further, the authentication information may include secrets, PIN codes, username/password combinations, digital certificate information, cryptographic information, biometric information, etc. Some examples of customer device information 132(1)-(N) include device identifiers (e.g., chipset identifier, serial number, etc.), subscriber information, associated customer identifiers, usage history, capability information, firmware information, software information, version information, authentication information, authorization information, encryption information, location information, quality of service information, manufacturer information, installation history, etc.

In some embodiments, the service provider 106 may store the customer information 130(1)-(N) and the customer device information 132(1)-(N) using a distributed directory service (e.g., Lightweight Directory Access Protocol) or a database. A "database" as used herein refers to an organized collection of data. In some embodiments, a database may include a plurality of data tables comprising data values (e.g., alphanumeric strings, integers, decimals, floating points, dates, times, binary values, Boolean values, and/or enumerations). Some examples of the databases include columnar databases, relational databases, key-store databases, graph databases, and document stores.

The application service 128 may be an application programing interface (API) configured to manage the customer devices 102(1)-(N). As such, the application service 128 may communicate with the customer devices 102(1)-(N) via the communication network 110. For example, the application service 128 may receive requests from the customer devices 102(1)-(N) and send responses to the customer devices 102(1)-(N) via the communication network 110. In some instances, the application service 128 may be a private API with access restricted to the customer devices 102(1)-(N). As described in detail herein, the application service 128 may coordinate the provisioning and/or enablement of the third-party applications 118(1)-(N) on the customer devices 102(1)-(N). As an example, the third-party application 118(1) may be initially disabled on the customer device 102(1) after installation of the customer device 118(1) at the residence of the customer 104(1). Further, the application service 128 may be configured to automatically provision and enable the third-party application within the customer device 102(1).

As illustrated in FIG. 1, the application service 128 may include a plurality of third-party tokens 134, vendor-issued information 136, a verification service 138, an entitlement service 140, and a third-party token management service 142. In some embodiments, the third-party token management service 142 may generate the plurality of third-party tokens 134(1)-(N) to facilitate access by the customer devices 102(1)-(N) to the plurality of third-party services 108(1)-(N). For example, the third-party token management service 142 may issue the third-party token 134(1) to the customer device 102(1) and the third-party service 108(1) to facilitate access by the customer device 102(1) to the content of the third-party service 108(1) via the third-party application 118(1).

The vendor-issued information 136 may include vendor-issued identifiers issued by the plurality of third-party services 108(1)-(N) for dissemination to the customer devices 102(1)-(N). In some instance, the vendor-issued identifiers may be unique identifiers used to monitor, control, and assist usage of the third-party services 108(1)-(N) by the customer devices 102(1)-(N) or the service provider 106. For example, the third-party service 108(1) may issue a plurality of vendor-issued identifiers to the service provider 106, and track the amount of content provided in association with the plurality of vendor-issued identifiers.

Further, in some embodiments, the vendor-issued information may include security requirements associated with the third-party tokens 134 generated to provide access to the third-party services 108(1)-(N). As an example, the third-party service 108(1) may require use of a specific type of token for use with the third-party service 108(1). As another example, the third-party service 108(1) may require use of a specific encryption method, encryption key, or encryption function input (e.g., the vendor-issued identifiers) when generating its third-party tokens 134. In yet still another example, the third-party service 108(1) may require use of one or more particular security protocols when transporting its third-party tokens 134 to the customer devices 102(1)-(N). In some other examples, the third-party service 108(1) may require use of a token or workflow compatible with one or more digital right management (DRM) technologies.

The verification service 138 may be configured to verify the customer devices 102(1)-(N) within the system 100. For example, the verification service 138 may verify that the customer device 102(1) is a device authorized to connect to the system 100 and/or the service provider 106. As another example, the verification service 138 may verify that the customer device 102(1) is located at an authorized location, such as the residence or place of business of the customer 104(1). Further, in some examples, the verification service 138 may verify the authenticity of the device applications 112(1)-(N).

As illustrated in the FIG. 1, the customer device 102(1) may send the device identifier 120(1) to the verification service 138. Upon receipt of the device identifier 120(1), the verification service 138 may verify the customer device 102(1) based on the device identifier 120(1). In some embodiments, the verification service 138 may employ the customer information 130(1) or the customer device information 132(1) to verify the customer device 102(1). For example, the verification service 138 may cross-reference the device identifier 120(1) against device identifiers recorded in the customer information 130(1) or the customer device information 132(1).

The entitlement service 140 may be configured to determine the service availability (i.e., an entitlement status) of the customer devices 102(1)-(N). For example, the entitlement service 140 may determine whether the customer device 102(1) is authorized to receive a premium sports channel using the customer information 130. In some embodiments, the entitlement service 140 may request customer information 130 from the CPS 126 indicating whether the customer 104(1) is subscribed to the premium sports channel. As another example, the entitlement service 140 may determine whether third-party applications 118(1)-(2) should be enabled or disabled on the customer device 102(1) based on the customer information 130(1) or customer device information 132(1). In some embodiments, the entitlement service 140 may request customer information 130(1) or the customer device information 132(1) from the CPS 126 indicating whether the customer 104(1) is subscribed to the third-party applications 118(1)-(2).

Further, in some instances, the CPS 126 may send notification information to the entitlement service 140 indicating a change (e.g., service upgrade or downgrade) to the service availability of one or more of the customer devices 102(1)-(N). Upon receipt of the notification information, the entitlement service 140 may send the updated entitlement information to the customer devices 102(1)-(N). For instance, the customer 104(1) may upgrade their service to include the third-party application 118(1). As such, the CPS may update the customer information 130 to reflect the update service availability, and send a notification to the entitlement service 140. Upon receipt of the notification, the entitlement service 140 may send entitlement information indicating the subscription to the third-party application 118(1) to an entitlement listener of the customer device 102(1). In response, the customer device 102(1) and the service provider 106 may perform provisioning and enablement of the third-party application 118(1).

The third-party token management service 142 may perform real-time enablement of the third-party applications 118(1)-(N) within the system 100. In some instances, the third-party token management service may perform real-time enablement upon installation of a customer device 102. In some other instances, the third-party token management service 142 may perform real-time enablement in response to a service availability update.

For example, during an installation or setup process of the customer device 102(1), the customer device 104(1) may send the device identifier 120(1) to the application service 128 to have the device application 118(2) provisioned and enabled on the customer device 102(1). Upon receipt of the device identifier 120(1), the third-party token management service 142 may employ the verification service 138 to verify the customer device 102(1) based on the device identifier 120(1). If the customer device 102(1) is a verified customer device within the system 100, the third-party token management service 142 may employ the entitlement service 140 to determine whether the customer device 102(1) is associated with a customer 104(1) that is a subscriber of either of the third-party applications 118(1)-(2).

In some embodiments, the entitlement service 140 may determine the entitlement status of the customer device 102(1) based on a customer identifier associated with the customer 104(1). For example, the entitlement service 140 may determine a customer identifier associated with the customer device 102(1) based on the customer information 130(1) or the customer device information 132(1), and determine whether the customer information 130(1) indicates that the customer 104(1) associated with the customer identifier is a subscriber of either of the third-party applications 118(1)-(2).

If the entitlement status determined by the entitlement service 140 indicates that the third-party application 118(1) should be enabled on the customer device 102(1), the third-party token management service 142 may identify a vendor-issued identifier issued by the third-party service 108(1) corresponding to the third-party application 118(1), and assign the vendor-issued identifier to the customer identifier. Further, the third-party token management service 142 may generate the third-party token 134(1). In some embodiments, the third-party token management service 142 may generate the third-party token 134(1) based at least in part on a security requirement of the third-party service.

For example, the third-party service 108(1) may require that the third-party token management service 142 generate the third-party token 134(1) using the customer identifier, the device identifier 120(1), the vendor-issued identifier, and a timestamp captured at the time of token creation. As such, the third-party token management service 142 may generate the third-party token 134(1) by applying a cryptographic function to a string, payload, encoded value, or hash based on a combination of the customer identifier, the device identifier 120(1), the vendor-issued identifier, and the timestamp. In some embodiments, the cryptographic function may be an Advanced Encryption Standard (AES) implementation. Employing the customer identifier (e.g., a subscriber identifier within the customer information 130(1), the device identifier 120(1), a vendor-issued identifier issued by the third-party service 108(1), and the timestamp creates a secure token unique to the customer device 102(1), the customer 104(1), and the third-party service 108(2). If the service provider 106 issues another customer device to the customer 104(1) or issues the customer device 102(1) to another customer, a new third-party token 134(2) will be generated and provided for use. If a factory reset is performed on the customer device 102(1) and the customer 104(1) maintains possession of the customer device 102(1), the service provider 106 will provide the previously-generated third-party token 134(1) to the customer device 102(1) for use with the third-party service 108(1) during an initialization process (e.g., self-provisioning of the customer device 102(1)). For example, customer device 102(1) may send a request for all third-party tokens previously generated for the customer device 102(1) during a re-initialization process. In response, the service provider 106 may determine that the customer device is currently associated with the customer identifier, and resend the third-party token to the customer device. In some embodiments, the service provider 106 may re-confirm the verification status of the customer device 102(1) and the entitlement status of the customer device 102(1) and/or the customer 104(1).

Once the third-party token management service 142 generates the third-party token 134(1), the third-party token management service 142 may send the third-party token 134(1) to the customer device 102(1) and the third-party service 108(1) associated with the third-party application 118(1). For example, the third-party token management service 142 may generate a first encrypted token 144 using a private key of a digital certificate and the third-party token 134(1), and send the first encrypted token 144 to the customer device 102(1) using a secure communications protocol (e.g., Transport Layer Security (TLS) protocol version 1.2). In some embodiments, the digital certificate may be pinned at the customer device 102(1). As such, the third-party token management service 142 and the customer device 102(1) may mutually authenticate each other during the transmission of the first encrypted token 144.

Further, the third-party token management service 142 may generate a second encrypted token 146 based on the third-party token 134(1), and send the second encrypted token 146 to the first third-party service 108(1). In some embodiments, the first encrypted token 144 and the second encrypted token 146 may be identical or similar. Alternatively, in some embodiments, the third-party token management service 142 may employ different cryptographic techniques and/or encryption keys to generate the first encrypted token 144 and the second encrypted token 146.

In response to receipt of the third-party token 134(1), the customer device 102(1) and the third-party service 108(1) may perform a handshake to enable the third-party application 118(1) on the customer device 102(1). During the handshake, the third-party service 108(1) and the customer device 102(1) may mutually authenticate each other, and establish that the customer device 102(1) is authorized to access the third-party service 108(1) by confirming that the customer device 102(1) possesses a token (i.e., the third-party token 134(1)) matching the vendor-issued information 136. Further, the handshake may enable the third-party application 118(1) on the customer device 102(1), and/or negotiate streaming parameters for delivery of the content 148 to the customer device 102(1).

Once the third-party service 108(1) and the customer device 102(1) establish that the customer device 102(1) is authorized to access the third-party service 108(1), the third-party service 108(1) may send content 148 from its content library 150 to the third-party application 118(1) for consumption by the customer 104(1) on the customer device 102(1) over-the-top. In some embodiments, the third-party service 108(1) may require presentation of a secure token (e.g., the third-party token 134(1)) prior to each transmission of content 148 from the content library 150.

Figure 2:
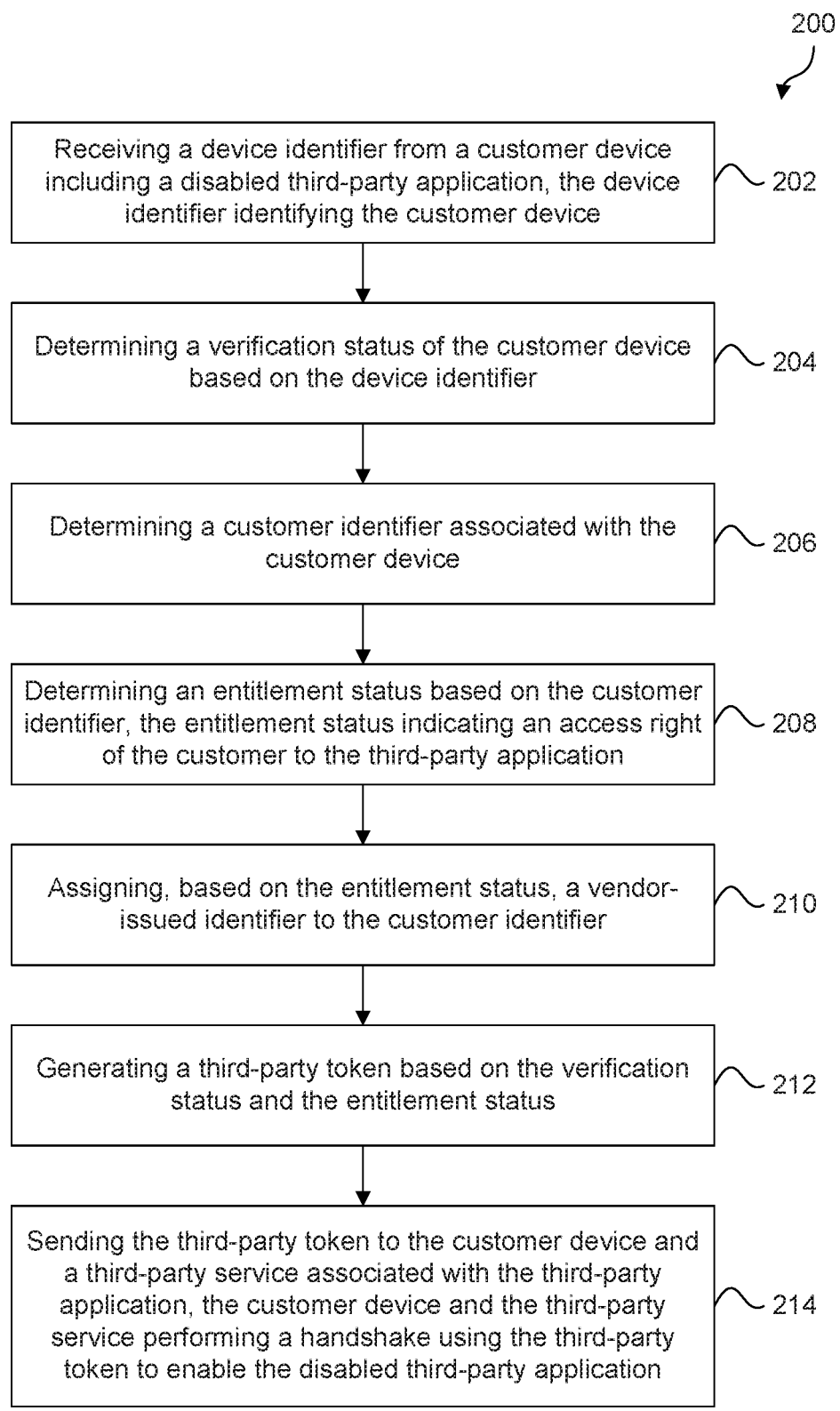
FIG. 2 is a flowchart illustrating a process for real-time enablement of over-the-top media service applications by a service provider, according to some embodiments.

FIG. 2 is a flowchart illustrating a process for real-time enablement of over-the-top (OTT) media service applications, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to those example embodiments.

At 202, a service provider receives a device identifier from a customer device including a disabled third-party application, the device identifier identifying the customer device. For example, during an installation or setup process of the customer device 102(1), the customer device 104(1) may send the device identifier 120(1) to the application service 128 to have the device application 118(2) provisioned and enabled on the customer device 102(1).

At 204, the service provider determines a verification status of the customer device based on the device identifier. For example, the third-party token management service 142 may employ the verification service 138 to verify the customer device 102(1) based on the device identifier 120 (1). If the customer device 102(1) is not a verified customer device within the system 100, the third-party token management service 142 may send a notification message to the customer device 102(1) indicating that verification of the customer device 102(1) failed.

At 206, the service provider determines a customer identifier associated with the customer device. For example, the application service 128 may identify the customer information 130(1) or customer device information 132(1) associated with the device identifier 120(1). Further, the customer information 130(1) or the customer device information 132(1) may include a customer identifier identifying the customer 104(1) associated with the customer device 102 (1).

At 208, the service provider determines an entitlement status based on the customer identifier, the entitlement status indicating an access right of the customer device to the third-party application. For example, the third-party token management service 142 may employ the entitlement service 140 to determine whether the customer device 102(1) is associated with a customer 104(1) that is a subscriber of either of the third-party applications 118(1)-(2). In some embodiments, the entitlement service 140 may determine the entitlement status of the customer device 102(1) based on the customer identifier associated with the customer 104(1). For example, the entitlement service 140 may determine whether the customer information 130(1) indicates that the customer 104(1) associated with the customer identifier is a subscriber of either of the third-party applications 118(1)-(2).

At 210, the service provider assigns, based on the entitlement status, a vendor-issued identifier to the customer identifier. For example, if the entitlement status determined by the entitlement service 140 indicates that the third-party application 118(1) should be enabled on the customer device 102(1), the third-party token management service 142 may identify a vendor-issued identifier issued by the third-party service 108(1) corresponding to the third-party application 118(1), and assign the vendor-issued identifier to the customer identifier.

At 212, the service provider generates a third-party token based on the verification status and the entitlement status. For example, the third-party token management service 142 may generate the third-party token 134(1). In some embodiments, the third-party token management service 142 may generate the third-party token 134(1) by applying a cryptographic function to the customer identifier, the device identifier 120(1), the vendor-issued identifier, and a timestamp captured at the time of token creation. Further, the third-party token management service 142 may store an encrypted copy of the third-party token 134(1) in a server device in a dark room for security purposes.

At 214, the service provider sends the third-party token to the customer device and a third-party service associated with the third-party application, the customer device and the third-party service performing a handshake using the third-party token to enable the disabled third-party application. For example, the third-party token management service 142 may send the third-party token 134(1) to the customer device 102(1) and the third-party service 108(1) associated with the third-party application 118(1). In some instances, the third-party token management service 142 may generate a first encrypted token 144 based on the third-party token 134(1) and a digital certificate corresponding to the pinned certificate information 124, and send the first encrypted token 144 to the customer device 102(1). Further, the third-party token management service 142 may generate a second encrypted token 146 based on the third-party token 134(1), and send the second encrypted token 146 to the first third-party service 108(1).

In addition, the customer device 102(1) and the third-party service 108(1) may recover the third-party token 134(1) from the first encrypted token and the second encrypted token, respectively. Further, the customer device 102(1) and the third-party service 108(1) may perform a handshake to enable the third-party application 118(1) on the customer device 102(1) using the third-party token 134(1). Once the third-party application 118(1) is enabled on the customer device 102(1), the third-party service 108(1) may stream the content 148 to the customer device 102(1).

Figure 3:
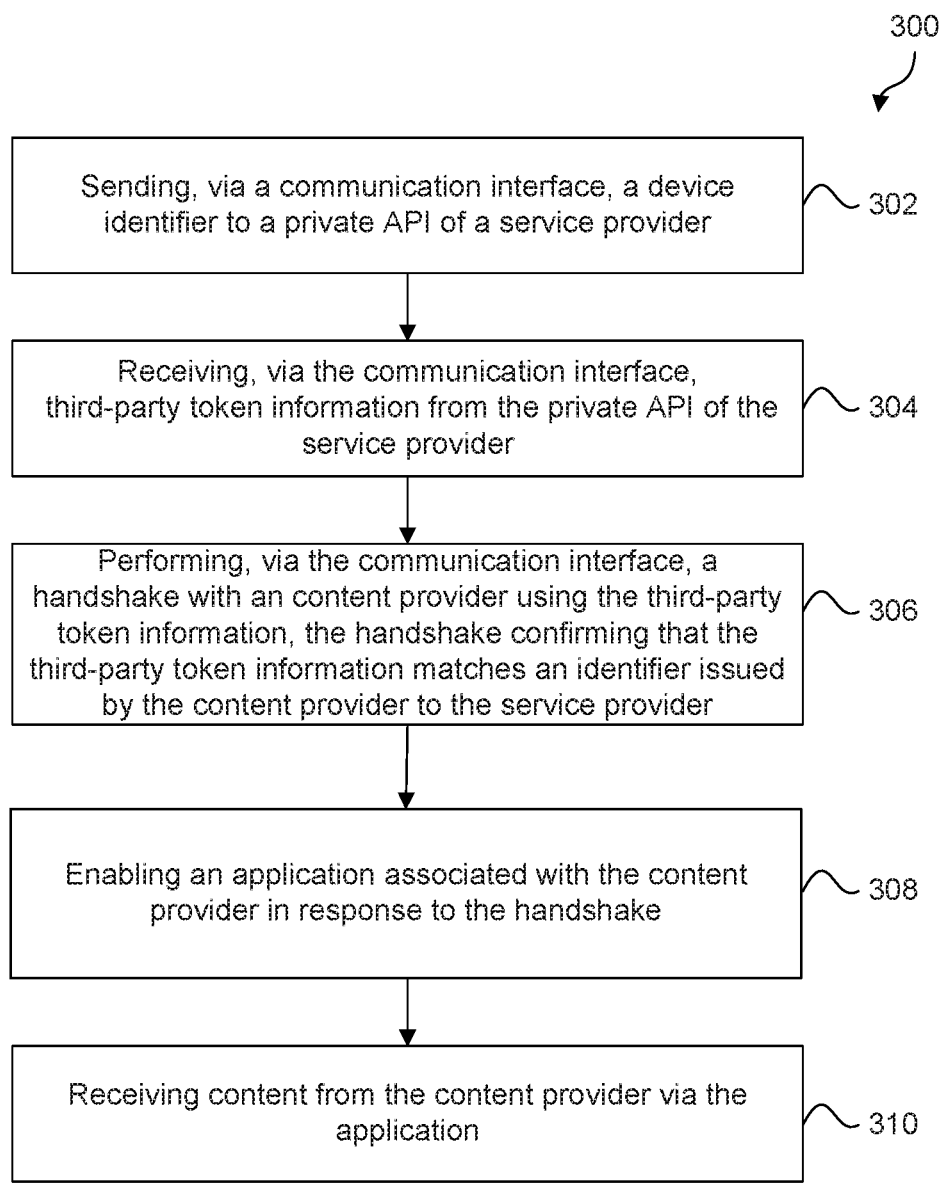
FIG. 3 is a flowchart illustrating a process for real-time enablement of over-the-top media service applications by a customer device, according to some embodiments.

FIG. 3 is a flowchart illustrating a process for real-time enablement of over-the-top (OTT) media service applications, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to those example embodiments.

At 302, a customer device sends a device identifier to a private API of a service provider. For example, in response to a service availability upgrade of the customer 104(1), the customer device 104(1) may send the device identifier 120(1) to the application service 128 to have the device application 118(1) provisioned and enabled on the customer device 102(1).

At 304, the customer device receives a third-party token information from the private API of the service provider. For example, the third-party token management service 142 may send the third-party token 134(1) to the customer device 102(1). In some embodiments, the third-party token management service 142 may generate a first encrypted token 144 using a digital certificate issued to the application service 128 and the third-party token 134(1), and send the first encrypted token 144 to the customer device 102(1). In some embodiments, the digital certificate may be pinned at the customer device 102(1). As such, the third-party token management service 142 and the customer device 102(1) may mutually authenticate each other during the transmission of the first encrypted token 144.

At 306, the customer device performs, via the communication interface, a handshake with a content provider using the third-party token information, the handshake verifying that the third-party token information matches an identifier issued by the content provider to the service provider. For example, in response to receipt of the third-party token 134(1), the customer device 102(1) and the third-party service 108(1) may perform a handshake to enable the third-party application 118(1) on the customer device 102 (1). During the handshake, the third-party service 108(1) and the customer device 102(1) may establish that the customer device 102(1) is authorized to access the third-party service 108(1) by confirming that the customer device 102(1) possesses a token (i.e., the third-party token 134(1)) matching the vendor-issued information 136.

At 308, the customer device enables an application associated with the content provider in response to the handshake. For example, once the third-party service 108(1) and the customer device 102(1) establish that the customer device 102(1) is authorized to access the third-party service 108(1), the customer device 102(1) may enable the device application 118(1) on the customer device 102(1).

At 310, the customer device receives content from the content provider via the OTT application. For example, once the third-party service 108(1) and the customer device 102(1) establish that the customer device 102(1) is authorized to access the third-party service 108(1) via the third-party token 134(1), the third-party service 108(1) may send the content 148 to the third-party application 118(1) on the customer device 102(1).

Figure 4:
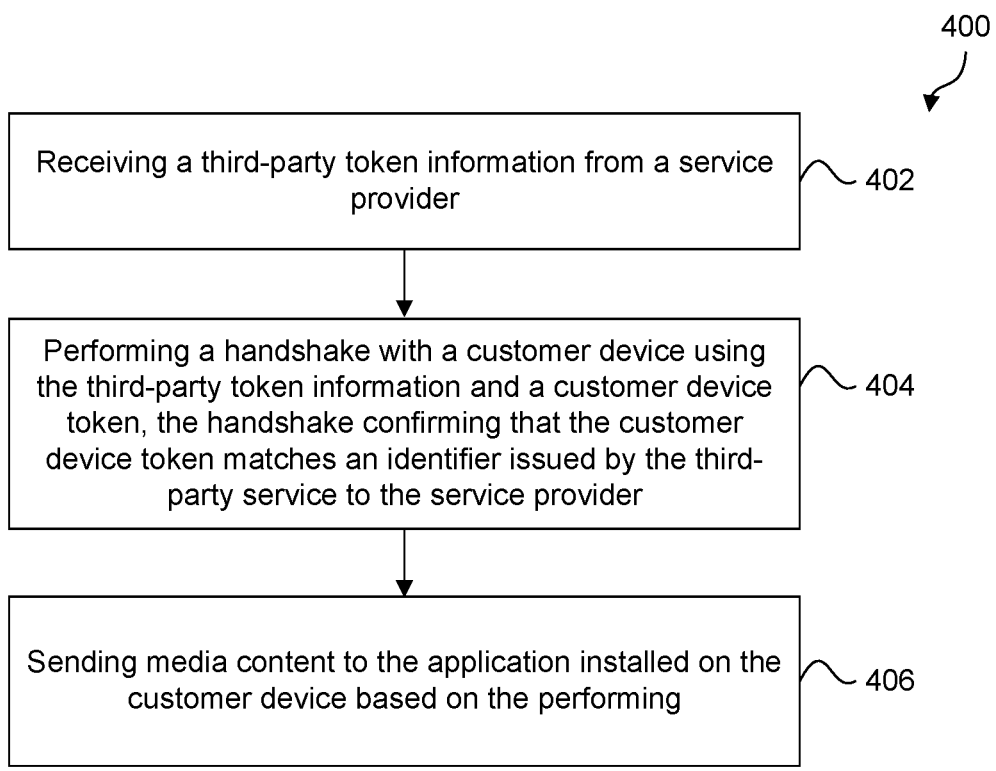
FIG. 4 is a flowchart illustrating a process for real-time enablement of over-the-top media service applications by a third-party service, according to some embodiments.

FIG. 4 is a flowchart illustrating a process for real-time enablement of over-the-top (OTT) media service applications, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1. However, method 400 is not limited to those example embodiments.

At 402, a third-party service receives a first encrypted token from a service provider. For example, the third party-service may receive the encrypted token 146 from the service provider 106.

At 404, the third-party service performs a handshake with the customer device using the third-party token information, the handshake confirming that the third-party token information matches an identifier issued to the service provider. For example, in response to receipt of the third-party token 134(1), the customer device 102(1) and the third-party service 108(1) may perform a handshake to enable the third-party application 118(1) on the customer device 102 (1). During the handshake, the third-party service 108(1) and the customer device 102(1) may establish that the customer device 102(1) is authorized to access the third-party service 108(1) by confirming that the customer device 102(1) possesses a token (i.e., the third-party token 134(1)) matching the vendor-issued information 136.

At 406, the third-party service sends media content to the application installed on the customer device based on the performing. For example, once the third-party service 108 (1) and the customer device 102(1) establish that the customer device 102(1) is authorized to access the third-party service 108(1), the third-party service 108(1) may send the content 148 to the third-party application 118(1) on the customer device 102(1).

Figure 5:
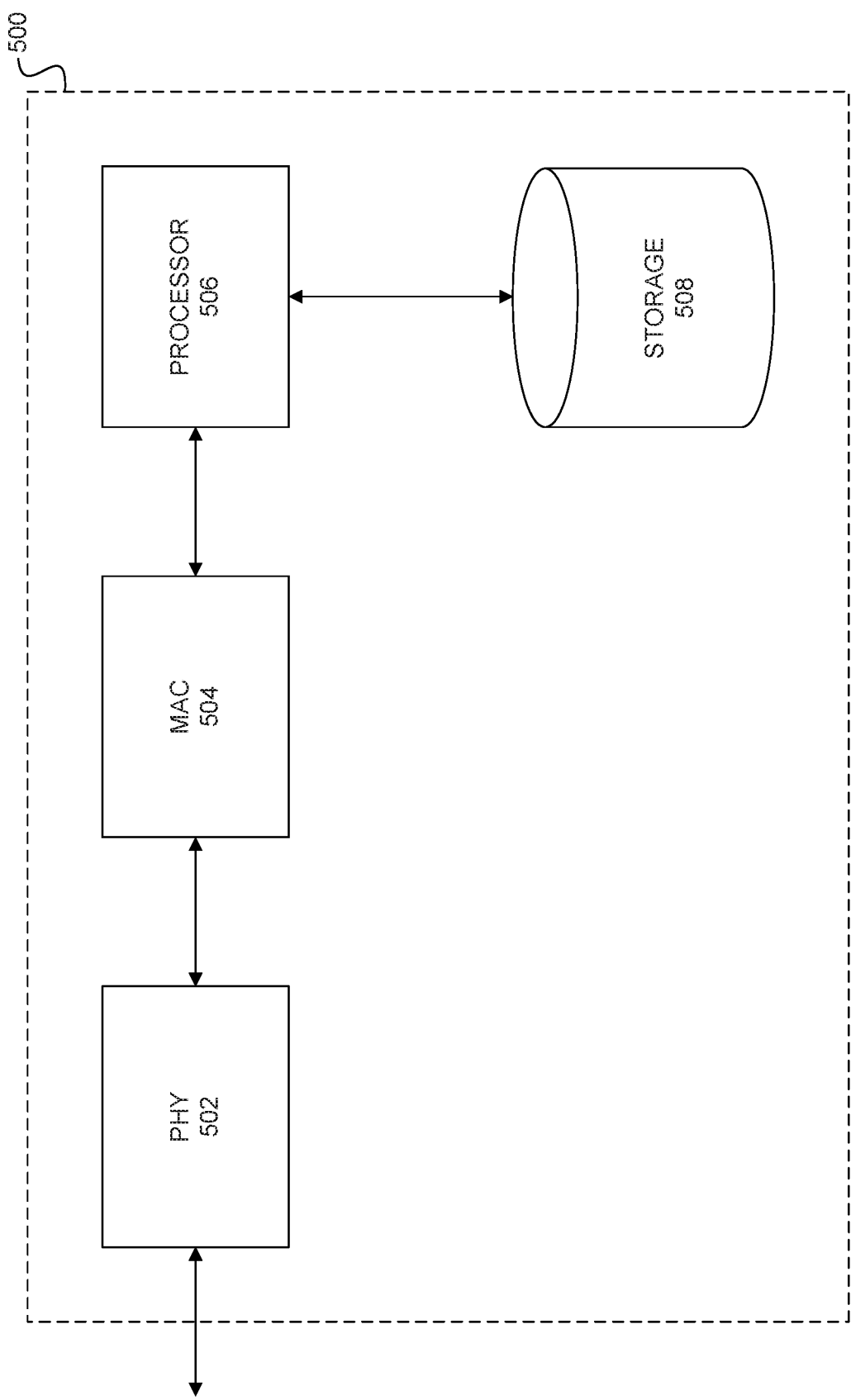
FIG. 5 illustrates a block diagram of an exemplary customer device useful for implementing various embodiments.

FIG. 5 illustrates a block diagram of an exemplary customer device 500 in exemplary point-to-multipoint communication system 100, according to an embodiment of the present disclosure. The customer device 500 may represent an exemplary embodiment of the customer devices 102(1)-(N). As described above, customers (e.g., the customer 104(1)) may access the services offered by services provider 106 and the third-party services 108(1)-(N) using the customer devices 102(1)-(N), which includes set-top boxes, personal computers, data terminal equipment, one or more telephony devices (e.g., mobile phones, mobile computing devices, broadband media players, network-controlled appliances, set-top boxes, wireless routers), and/or other devices that are capable of transmitting and/or receiving video, audio, and/or data that will be apparent to those skilled in the relevant art(s) without departing from the spirit and scope of the present disclosure. As illustrated in FIG. 5, customer device 500 includes PHY circuitry 502, media access controller (MAC) circuitry 504, processor circuitry 506, and storage medium 508.

PHY circuitry 502 represents an interface between a communication network, such as communication network 110 to provide an example, and MAC circuitry 504. Generally, PHY circuitry 502 may modulate, encode, and/or convert an information frame to provide an information signal for transmission to the communication network. PHY circuitry 502 may also demodulate, decode, and/or convert an information signal received over a communication network to provide an information frame.

MAC circuitry 504 represents an interface between PHY circuitry 502 and processor circuitry 506. MAC circuitry 504 may manage and maintain communication by coordinating access to the communication network and formatting communication in accordance with one or more communication standards or protocols. MAC circuitry 504 may also de-encapsulate or de-frame in accordance with the one or more communication standards or protocols.

Processor circuitry 506 controls the overall operation of customer device 500. Processor circuitry 506 may perform functions relevant to real-time enablement of OTT media service applications. In one embodiment, processor circuitry 506 may retrieve a device identifier from local storage and send the device identifier to a service provider. Processor circuitry 506 may perform actions to receive a secure token generated using the device identifier, and perform a handshake with a third-party service using the secure token. Processor circuitry 506 may also process user requests, process inputs made within a graphical user interface, manage and control provision of the media content once transmitted/received from the third-party service, control the entry into and out of a standby mode, power the device on/off, load an operating system, and/or perform other suitable processing functions related to customer device 500.

Storage medium 508 stores a third-party token, media content, various database tables or other suitable information about customer device 500, and other information needed to perform the functions offered by the service provider or the third-party services. Storage medium 508 may store media content within a volatile memory, such as random access memory (RAM), and/or non-volatile memory, such as read-only memory (ROM). The RAM may be implemented in dynamic random-access memory (DRAM), a static random-access memory (SRAM), and/or a non-volatile random-access memory (NVRAM) configuration to provide some examples. Storage medium 508 may be organized into a database and may leverage any suitable database management system to store information. Storage medium 508 may store a device identifier, i.e., a serial number, for a particular customer device 500 for purposes of identifying customer device 500 in communications with service provider 106.

Figure 6:
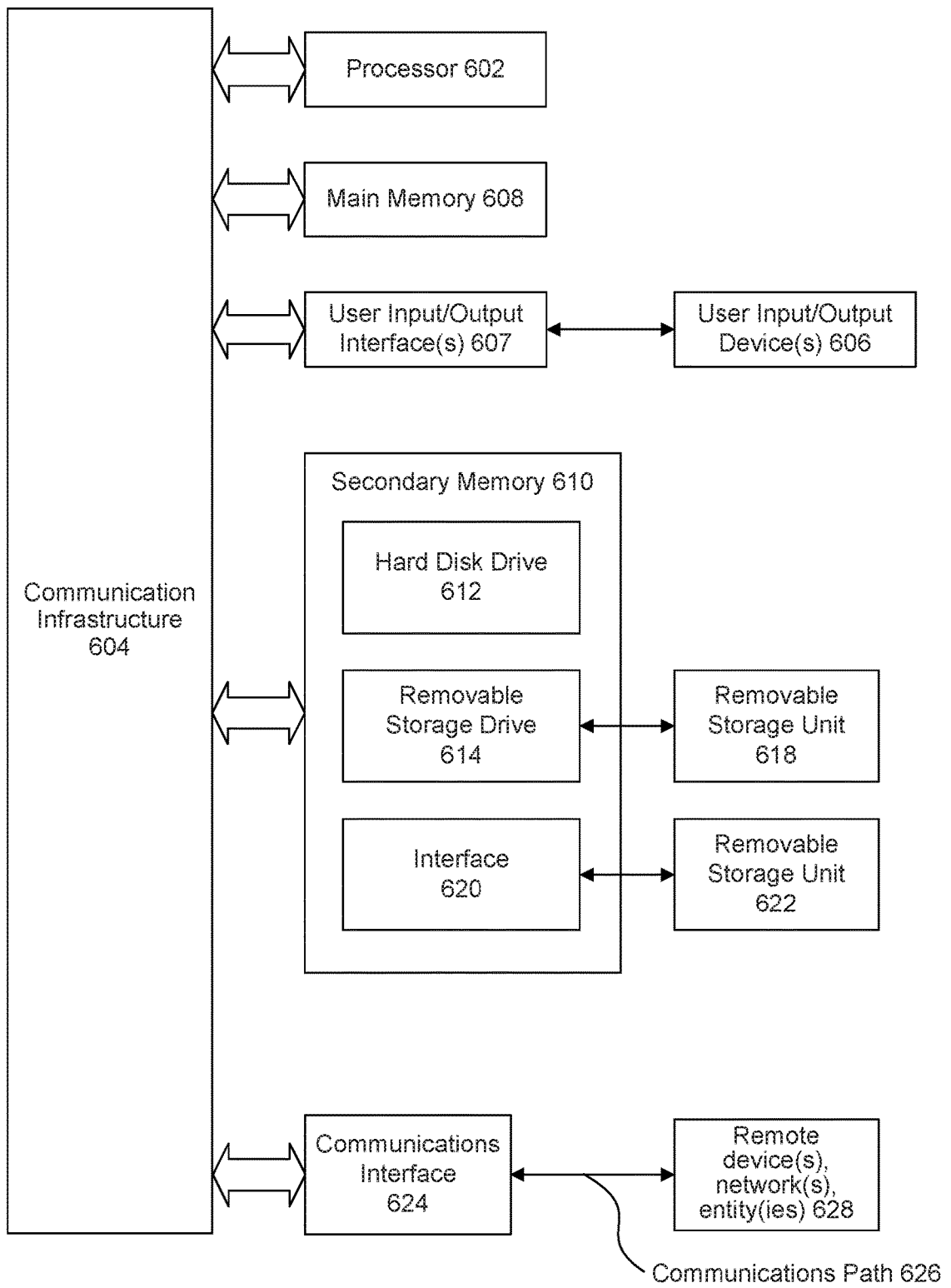
FIG. 6 is an example computer system useful for implementing various embodiments.

Various aspects of the disclosure may be implemented by software, firmware, hardware, or a combination thereof. FIG. 6 illustrates an example computer system 600 in which some embodiments, or portions thereof, may be implemented as computer-readable code. Various embodiments are described in terms of the example computer system 600. After reading this description, it will become apparent to a person skilled in the relevant art how to implement the embodiments using other computer systems and/or computer architectures.

Computer system 600 includes one or more processors, such as processor 602. Processor 602 may comprise suitable logic, circuitry, dedicated circuits, and/or code that may enable processing data and/or controlling operations of computer system 600. Processor 602 may be a special purpose or a general purpose processor. Processor 602 is connected to a communication infrastructure 604 (for example, a bus or network). Processor 602 may be enabled to provide control signals to the various other portions of computer system 600 via communication infrastructure 604, for example.

Computer system 600 may also include user input/output device(s) 606, such as monitors, keyboards, pointing devices, etc., which may communicate with communication infrastructure 604 through user input/output interface(s) 607.

Computer system 600 also includes a main memory 608, and may also include a secondary memory 610. Secondary memory 610 may include, for example, a hard disk drive 612 and a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, an interface 620 and a removable storage unit 622. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels. Communication interface 624 may enable computer system 600 to communicate and interact with any combination of external devices, external networks, external entities, etc. (individually and collectively referenced by reference number 628) over the communications path 626.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g., DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the embodiments as discussed herein. In particular, the computer programs, when executed, enable processor 602 to implement the disclosed processes. Accordingly, such computer programs represent controllers of the computer system 600. Where the embodiments are implemented using software, the software may be stored in a computer program product and loaded into computer system 600 using removable storage drive 614, interface 620, hard drive 612 or communications interface 624. This may be accomplished, for example, through the use of general-programming languages (such as C or C++). The computer program code may be disposed in any known computer-readable medium including semiconductor, magnetic disk, or optical disk (such as, CD-ROM, DVD-ROM). As such, the code may be transmitted over communication networks including the Internet and internets. It is understood that the functions accomplished and/or structure provided by the systems and techniques described above may be represented in a core (such as a processing-unit core) that is embodied in program code and may be transformed to hardware as part of the production of integrated circuits. This may be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A method, comprising:

receiving, by a service provider, a device identifier from a customer device, the customer device including a disabled third-party over-the-top (OTT) application and the device identifier identifying the customer device;

determining, by the service provider, a verification status of the customer device based on the device identifier, the verification status identifying whether the customer device is authorized to connect to the service provider;

determining, by the service provider, a customer identifier associated with the customer device, the customer identifier including information identifying a customer associated with the customer device;

determining, by the service provider, an entitlement status based on the customer identifier, the entitlement status indicating an access right of the customer device to the disabled third-party OTT application;

assigning, by the service provider based on the entitlement status, a vendor-issued identifier to the customer identifier;

determining, by the service provider, a security requirement associated with a third-party service associated with the disabled third-party OTT application;

generating, by the service provider, a third-party token to meet the security requirement based on the verification status and the entitlement status; and sending, by the service provider, the third-party token to the customer device and the third-party service to enable the customer device and the third-party service to enable the disabled OTT third-party application on the customer device using the third-party token.

2. The method of claim 1, wherein the sending comprises:
identifying pinned certificate information provided to the customer device;
generating token information based on the third-party token and a private key of the pinned certificate information; and
sending, via a private application programming interface (API) service, the token information to the customer device.

3. The method of claim 1, wherein the generating the third-party token comprises generating the third-party token based on a timestamp, the device identifier, the customer identifier, or the vendor-issued identifier.

4. The method of claim 1, wherein the customer device comprises a first customer device,
wherein the customer identifier comprises a first customer identifier,
wherein the third-party token comprises a first third-party token,
wherein the vendor-issued identifier comprises a first vendor-issued identifier, and
wherein the method further comprises:
determining a second entitlement status based on a second customer identifier, the second entitlement status indicating a second access right of a second customer device to the disabled third-party OTT application;
assigning, based on the second entitlement status, a second vendor-issued identifier to the second customer identifier;
generating a second third-party token based on a timestamp, a second customer device identifier, the second customer identifier, and the second vendor-issued identifier; and
sending the second third-party token to the second customer device and the third-party service to enable the second customer device and the third-party service to enable the disabled third-party OTT application on the second customer device using the second third-party token.

5. The method of claim 1, further comprising:
receiving a request for the third-party token during an initialization process;
determining that the customer device is currently associated with the customer identifier; and
resending the third-party token to the customer device.

6. The method of claim 1, wherein the disabled third-party OTT application comprises a subscription-based streaming application installed on the customer device.

7. The method of claim 1, wherein the customer device comprises a set top box, and
wherein the third-party service comprises a streaming service configured to stream content to the set top box.

8. The method of claim 1, wherein the sending comprises sending the third-party token to the customer device and the third-party service to enable the customer device and the third-party service to perform a handshake using the third-party token to enable the disabled OTT third-party application on the customer device.

9. A service provider system, comprising:
a memory configured to store a vendor-issued identifier associated with a third-party over-the-top (OTT) application; and
one or more processors configured to execute instructions stored in the memory, the instructions when executed by the one or more processors, configuring the one or more processors to:
receive a device identifier from a customer device, the customer device including the third-party OTT application and the device identifier identifying the customer device;
determine a verification status of the customer device based on the device identifier, the verification status identifying whether the customer device is authorized to connect to the service provider system;
determine a customer identifier associated with the customer device, the customer identifier including information identifying a customer associated with the customer device;
determine an entitlement status based on the customer identifier, the entitlement status indicating an access right of the customer device to the disabled third-party OTT application;
assign, based on the entitlement status, the vendor-issued identifier to the customer identifier;
determine a security requirement associated with a third-party service associated with the third-party OTT application;
generate a third-party token to meet the security requirement based on the verification status and the entitlement status; and
send the third-party token to the customer device and the third-party service to enable the customer device and the third-party service to enable the third-party OTT application on the customer device using the third-party token.

10. The service provider system of claim 9, wherein the instructions, when executed by the one or more processors, configure the one or more processors to:
identify pinned certificate information provided to the customer device;
generate token information based on the third-party token and a private key of the pinned certificate information; and
send, via a private application programming interface (API) service, the token information to the customer device.

11. The service provider system of claim 9, wherein the instructions, when executed by the one or more processors, configure the one or more processors to generate the third-party token based on a timestamp, the device identifier, the customer identifier, or the vendor-issued identifier.

12. The service provider system of claim 9, wherein the customer device is a first customer device,
wherein the customer identifier comprises a first customer identifier,
wherein the third-party token comprises a first third-party token,
wherein the vendor-issued identifier comprises a first vendor-issued identifier, and
wherein the one or more processors are further configured to:
determine a second entitlement status based on a second customer identifier, the second entitlement status indicating a second access right of a second customer device to the third-party application;
assign, based on the second entitlement status, a second vendor-issued identifier to the second customer identifier;

generate a second third-party token based on a timestamp, a second customer device identifier, the second customer identifier, and the second vendor-issued identifier; and send the second third-party token to the second customer device and the third-party service to enable the second customer device and the third-party service to enable the third-party OTT application on the second customer device.

13. The service provider system of claim 9, wherein the instructions, when executed by the one or more processors, further configure the one or more processors to:

receive a request for the third-party token during an initialization process;

determine that the customer device is currently associated with the customer identifier; and resend the third-party token to the customer device.

14. The service provider system of claim 9, wherein the third-party OTT application comprises a subscription-based streaming application installed on the customer device.

15. The service provider system of claim 9, wherein the customer device comprises a set top box, and wherein the third-party service comprises a streaming service configured to stream content to the set top box.

16. The service provider system of claim 9, wherein the instructions, when executed by the one or more processors, configure the one or more processors to send the third-party token to the customer device and the third-party service to enable the customer device and the third-party service to perform a handshake using the third-party token to enable the OTT third-party application on the customer device.

17. A system, comprising:

a memory that stores instructions; and one or more processors configured to execute the instructions stored in the memory, the instructions when executed by the one or more processors, configuring the one or more processors to:

receive a device identifier from a customer device, the customer device including a third-party over-the-top (OTT) application and the device identifier identifying the customer device;

determine a verification status of the customer device based on the device identifier;

determine a customer identifier associated with the customer device;

determine an entitlement status based on the customer identifier, the entitlement status indicating an access right of the customer device to the disabled third-party OTT application;

assign, based on the entitlement status, a vendor-issued identifier to the customer identifier;

generate a third-party token based on the verification status and the entitlement status, the third-party token to meet a security requirement associated with a third-party service that is associated with the third-party OTT application; and send the third-party token to the customer device and the third-party service to enable the customer device and the third-party service to perform a handshake using the third-party token to enable the third-party OTT application on the customer device.

18. A customer device, comprising:

a communication interface;

a memory including a device identifier, an over-the-top (OTT) application associated with a content provider, and pinned certificate information associated with a service provider;

one or more processors and/or circuits configured to:

send, via the communication interface, the device identifier to a private application programming interface (API) of a service provider;

receive, via the communication interface, third-party token information from the private API of the service provider and digital certificate information from the service provider;

determine whether the digital certificate information matches the pinned certificate information to authenticate the customer device with the service provider;

perform, via the communication interface in response to the digital certificate information matching the pinned certificate information, a handshake with the content provider using the third-party token information, the handshake confirming that the third-party token information matches an identifier issued by the content provider to the service provider;

enable, in response to the handshake, the OTT application associated with the content provider; and receive content from the content provider via the OTT application.

19. The customer device of claim 18, wherein the device identifier includes a chipset identifier.

20. The customer device of claim 18, wherein the device identifier is stored in the memory in an offline environment.

* * * * *